United States Patent [19]

Steinberg

[11] 4,421,709
[45] Dec. 20, 1983

[54] HIGH CAPACITY POLYMER QUENCHING ON THIN SHELL WHEELS

[75] Inventor: Neil I. Steinberg, Greer, S.C.

[73] Assignee: E. I. Du Pont de Nemours & Co., Wilmington, Del.

[21] Appl. No.: 458,869

[22] Filed: Jan. 10, 1983

[51] Int. Cl.³ ............................................. B29D 7/02
[52] U.S. Cl. .................................. 264/216; 425/223; 425/224; 425/471
[58] Field of Search .................. 264/28, 176 R, 210.1, 264/216; 425/66, 223, 224, 471

[56] References Cited

U.S. PATENT DOCUMENTS

| 2,627,088 | 2/1953 | Allet et al. | |
|---|---|---|---|
| 2,779,684 | 1/1957 | Allet | |
| 3,142,866 | 8/1964 | Pabo | |
| 3,853,447 | 12/1974 | Steinberg | 425/223 |

FOREIGN PATENT DOCUMENTS 681944 3/1964 Canada ................. 264/216

Primary Examiner—James B. Lowe

[57] ABSTRACT

To increase the rate of production of polyester film in cases where such film is produced by extruding a molten polymer onto the quenching surface of a rotating casting wheel, the shell thickness of the casting wheel is reduced.

6 Claims, 7 Drawing Figures

HIGH CAPACITY POLYMER QUENCHING ON THIN SHELL WHEELS

BACKGROUND OF THE INVENTION

1. Technical Field

The invention relates to the casting of polymeric film, and to an improved process and apparatus therefor.

2. Background Art

In Alles and Saner, U.S. Pat. No. 2,627,088, there is disclosed a process of preparing photographic film which includes casting a molten highly polymeric polyester into an unsupported sheet of film, the polyester being also capable of being spun into filaments, which when cold drawn, exhibit, by characteristic X-ray patterns, molecular orientation along the fiber axis. The properties of such film may be further enhanced by a post casting treatment of the type disclosed by Alles, U.S. Pat. No. 2,779,684 to provide a highly dimensionally stable polyester film suitable for use in the photographic industry.

Traditionally, the casting procedure for such film involves extruding molten polymer onto a casting wheel at a temperature sufficiently high to assure good flow properties for the extrudate during the extrusion process, and then quenching said extrudate to provide a self-supporting web of film, which is further treated as shown in Alles above. The purpose of the quenching process is to cool the molten polymer to a temperature below its glass transition temperature through the bulk of the cast web to form a permanently self-supporting web which may be then stored or subjected to other treatment as desired. Commonly the casting wheel upon which the molten polymer is extruded also serves to quench the film. To that end, the casting wheel is hollow and a coolant fluid is circulated within said wheel to remove heat from the surface of the web supported on the wheel. Simultaneously the outer surface of the cast web may also be cooled, using air impingement, cooling baths, chilled rolls, or combinations thereof. U.S. Pat. No. 3,853,447 discloses a combination casting and quenching apparatus which is useful in providing a high quality quenched web by employing a combination of the aforementioned cooling techniques.

While the use of combined casting and quenching wheels has proven satisfactory for the production of high quality polyester film, problems begin to surface when higher and higher production rates are desired. Since heat must be removed from the molten polymer while on the casting wheel, either (1) the size of the wheel must be increased as the production rate is increased, or (2) heat must be removed from the polymer at a faster rate, or both. At the same time, the casting wheel must be maintained true to a high degree of accuracy since it is the distance between the extruder lip and the outer wheel surface that determines the final product thickness and, even more important, the thickness uniformity of the cast web. The casting wheel is subjected to substantial stresses because of temperature fluctuations ranging from (a) over 275° C. at the point where the molten polymer contacts the wheel surface, to (b) below 75° C. at the point where the polymer has been cooled to below its glass transition temperature, to (c) the coolant fluid temperature of about 15° C. In addition to the above, an axial temperature gradient tends to form on the casting surface because the extreme ends do not carry any polymer and are exposed to the atmosphere and consequently to room temperature. The resulting distortion of the casting surface can be fatal to the success of the casting operation, a problem which is discussed in Pabo, U.S. Pat. No. 3,142,866. To prevent such distortion or deformation it is common practice to go to casting wheels of increased size and massive construction or adopt complicated wheel structures as shown in Pabo above. However, the coolant fluid can only remove heat at a finite rate from the interior surface of the casting wheel. Thus, the rate of production as measured in terms of pounds of polymer per hour for a given installation appears limited by engineering factors related to the casting wheel and coolant heat-removing ability.

BRIEF SUMMARY OF THE INVENTION

The production capacity of a system which involves casting a molten web of thermoplastic film-forming polymer on the peripheral surface of a cooled casting wheel may be greatly increased without any loss in film thickness uniformity by reducing the shell thickness of the wheel rather than increasing its diameter. Surprisingly, reducing the shell thickness makes the wheel deformation less instead of more, and without the need for internal supports. The overall process comprises cooling the under surface of the molten web on the casting surface to a temperature and depth sufficient to permit stripping it from said casting surface, and thereafter proceeding to strip the web from the casting surface; characterized in that the production capacity is increased by reducing the shell thickness of the casting wheel to a thickness in inches less than 0.1875 times the casting wheel diameter in feet, but in no case greater than 0.9375 inches and not less than $4.7\ D^{0.5}E^{-0.25}$.

Typically, the thermoplastic film-forming polymer is a polyester, specifically polyethylene terephthalate, the molten web is cast at a temperature of at least 265° C., and the undersurface of the molten web is cooled to a temperature below the glass transition temperature of the polymer to a depth not exceeding 25% of the polymer web thickness as cast.

To practice this process the film casting wheel comprises:

a closed hollow body member having a tubular portion forming a shell of heat conductive material, the external surface of which constitutes the casting surface onto which a stream of molten thermoplastic polymer is to be deposited, and having end walls of heat conductive material closing the ends of said tubular portion and directly connected thereto so as to be in heat conductive relation therewith;

means for supporting said body member for rotation about the axis of said tubular portion;

means for filling said hollow body member with a cooling liquid, and means for circulating said cooling liquid into and out of said body member while it is rotating, to control the temperature of said casting surface; characterized in that the shell of said casting wheel has a thickness in inches, less than 0.1875 times the diameter of the hollow body measured in feet but in no case greater than 0.9375 inches, and not less than $4.7\ D^{0.5}E^{-0.25}$ where E is the modulus of elasticity of the wheel shell in psi. It goes without saying that the total thermal stress-induced deformation should not exceed the elastic limit of the construction material of the wheel shell.

THE DRAWINGS

DETAILED DESCRIPTION OF THE INVENTION

Figure 1:
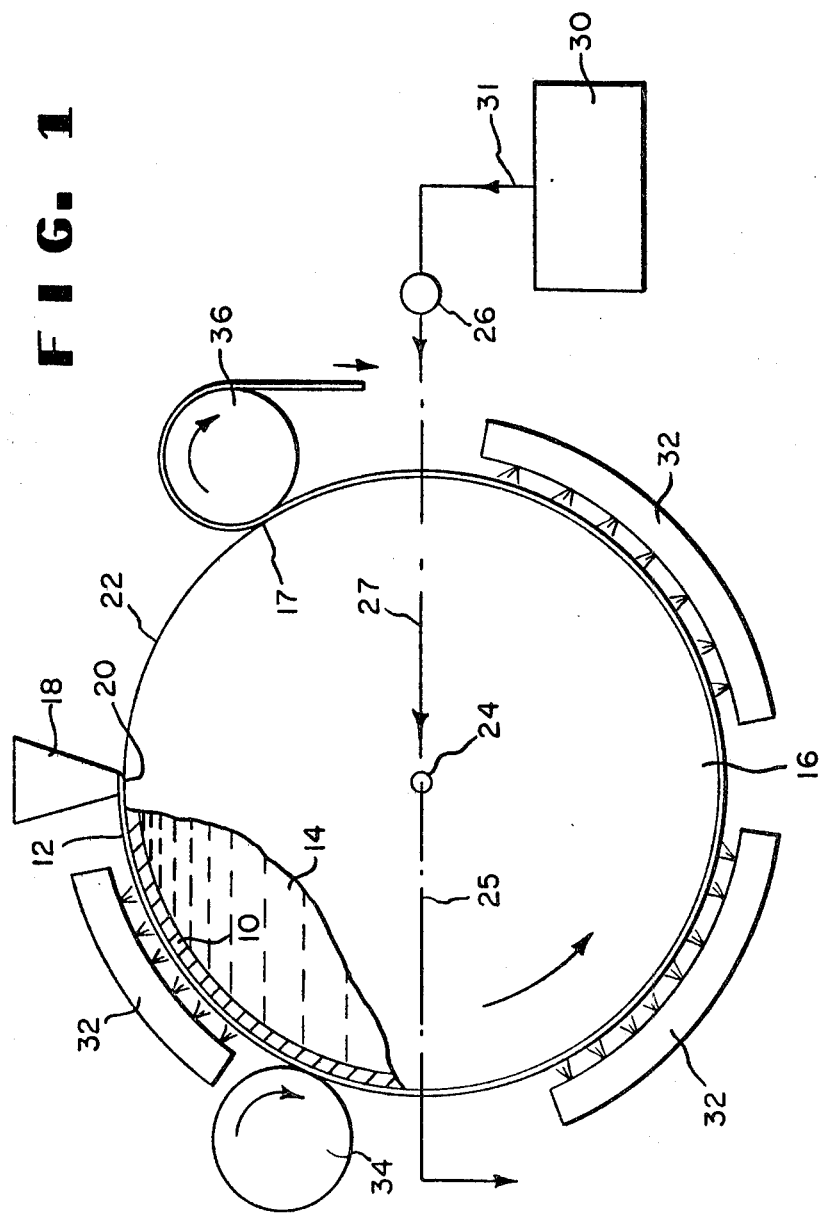
FIG. 1 is a schematic representation of an end view, partly in section, of a casting wheel for the practice of this invention.

Referring to FIG. 1, a casting wheel 16 having a shell 10, illustrated in cross-section, is positioned under an extrusion device 18 which forms a nip 20 with the surface 22 of the casting wheel. The latter is supported along its axis 24 and a motor drive, not shown, rotates the wheel in the direction of the arrow. A coolant fluid 14 from a reservoir 30 is supplied to the casting wheel 16 through a pump 26 and a piping system generally denoted as 31, 27 and 25. Coolant thus enters the wheel, circulates within, and exits, carrying away heat from the inner surface of the shell and controlling its temperature.

In operation, a web of molten polymer 12, extruded through extruder 18 and nip 20, is carried by the rotating casting wheel 16 until it reaches a point 17 by which time it has formed a skin layer on the underside contacting the wheel, sufficient to allow stripping. The outer web surface may be also subjected to accelerated cooling by contact with a gaseous or liquid coolant, e.g., by air impingement through a system of air nozzles generally indicated at 32. A cool calendering roll 34 assures good contact between the molten web 12 and the casting surface 22 and also serves to smooth irregularities on the outer surface of the cast web.

As the web reaches point 17 on the casting wheel, it is stripped by takeoff roll 36 and advanced for further treatment (not shown).

The transfer of heat from molten polymer web 12 through the wheel shell 10 into the coolant 14 is schematically shown in FIG. 1. The rate of heat transfer q is dependent on two processes. First, heat is conducted through the wheel shell 12, a conduction process, and then it is removed by the coolant through a convection process across the wheel coolant interface. For purposes of this invention the interfacial heat transfer between the polymer and the wheel outer surface 22 is ignored. The above described heat transfer process may be expressed in mathematical form as:

$$q = UA\Delta T$$

where
U represents the overall heat transfer coefficient,
A represents the contact area between the polymer and the wheel and
$\Delta T$ is the mean temperature difference between the polymer surface and the coolant.

It is obvious from this relationship that increasing the overall heat transfer coefficient will result in greater heat transfer q and therefore higher cooling capacity for a given wheel. The overall heat transfer coefficient is the composite of the conductive heat transfer coefficient $h_w$ for the casting wheel, and the convective heat transfer coefficient, $h_c$, between the wheel and coolant interface. The relationship is given by the equation $$\frac{1}{U} = \frac{1}{hw} + \frac{1}{hc}$$

In the past a great deal of effort has gone into increasing the convective heat transfer coefficient which is dependent upon the cooling passage design, the average coolant velocity, and the coolant fluid heat transfer properties. There comes a point, however, where further increases in that coefficient will only yield a small increase in the overall coefficient. This is because of the reciprocal addition relation between the overall coefficient and the individual coefficients given above in which increasing the value of $h_c$ while holding $h_w$ constant has a diminishingly small effect on the overall coefficient. Table I shows the effect of increasing $h_w$ from a nominal value to infinity for a given value of $h_c$ in terms of % change in the overall coefficient.

TABLE 1

| U | hw | hc | % Change |
|---|----|----|----------|
| 95 | 130 | 350 | — |
| 110 | 130 | 700 | 16% |
| 130 | 130 | Infinity | 36% |

The term hw which characterizes the conductive heat transfer through the shell of the wheel is dependent upon the heat transfer properties of the material of construction and the thickness l of the wheel. If k is the thermal conductivity of the wheel shell material, then $hw = k/l$. Thus a thinner shell would change hw. The effect of this coefficient change is shown in Table II.

TABLE II

| U | hw | hc | % Change | l |
|---|----|----|----------|---|
| 95 | 130 | 350 | — | 1.3 inches (33.02 mm) |
| 142 | 240 | 350 | 49% | .7 inches (17.78 mm) |

The aforesaid determines the important elements in maximizing the rate of heat removed from the polymer through the casting wheel shell. The complete cooling process may be divided into two distinct heat transfer mechanisms: stripping and bulk cooling. Either of these may determine the heat transfer limit of the wheel. Maximum casting capacity may therefore be defined as the point where either of those becomes limiting.

At the bulk cooling limit the full thickness of the cast web is cooled to an average temperature below the glass transition temperature. At the stripping limit the polymer sticks to the casting wheel. To break the adhesive forces developed between the polymer and the casting wheel, a thin layer of polymer in contact with the casting wheel must be cooled below the glass transition temperature. When thus cooled, this layer begins to contract, generating a stress which breaks the adhesion forces holding the polymer on the wheel and allows the as-cast sheet to release from the wheel.

Figure 6:
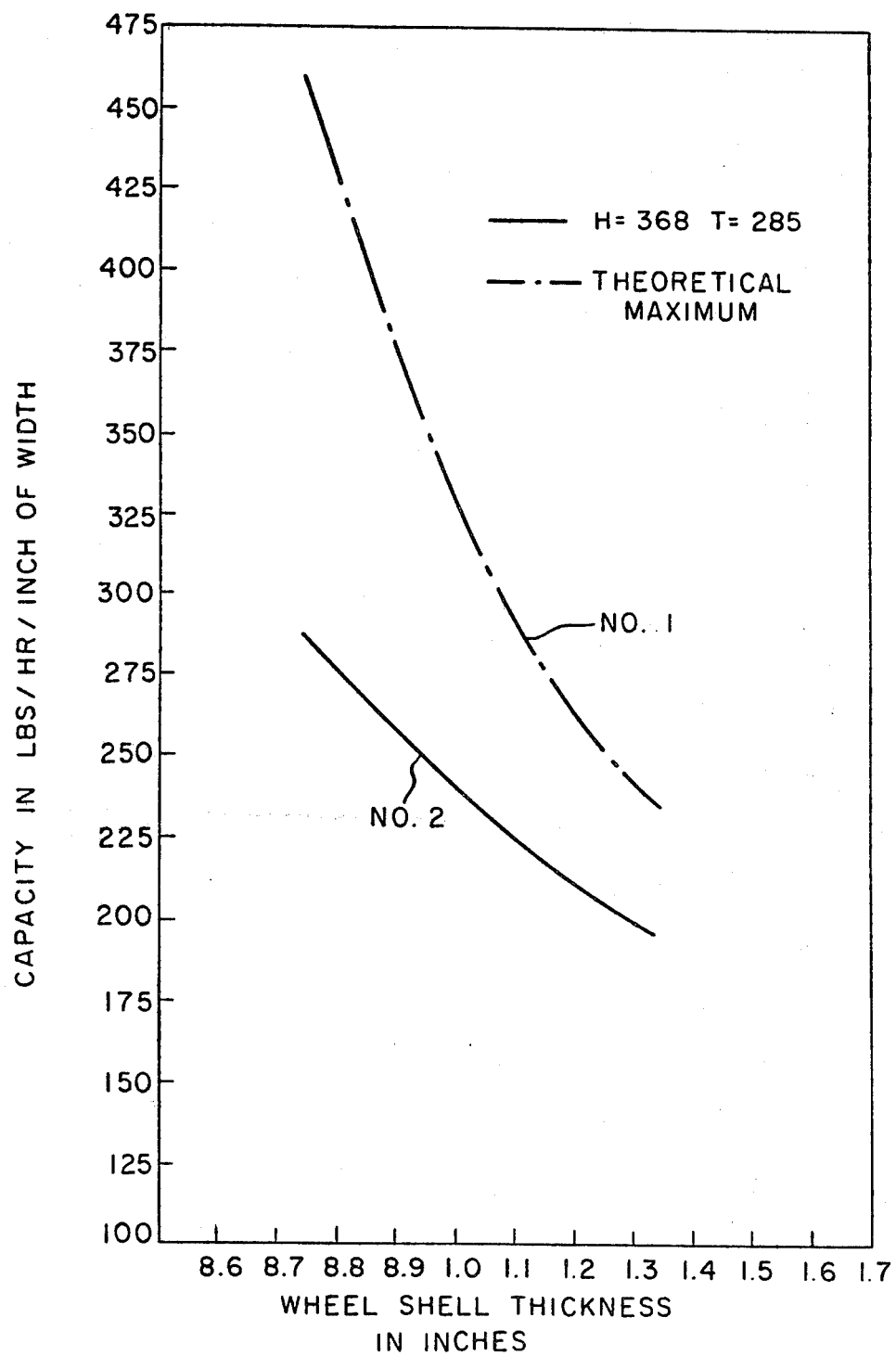
FIG. 6 is a graphic representation of the cooling capacity of a casting wheel as a function of shell thickness.

When the stripping temperature becomes a limitation to the dwell time of the polymer on the casting wheel i.e., when heat from the lower surface of the polymer layer which is in contact with the wheel cannot be removed at the rate which the polymer is cast the heat transfer coefficient of the casting wheel shell becomes significant. Bulk cooling then becomes irrelevant. Under these circumstances the shell thickness becomes critical, and a reduction in shell thickness substantially increases casting rate. This is illustrated in FIG. 6 in which the casting rate in pounds of polymer per hour is plotted against the shell thickness of a five foot diameter casting wheel. Two curves are developed for the case where a 0.090 inch thick film is cast. Curve No. 1 is the theoretical maximum rate, calculated for the case where stripping occurs when an infinitesimal layer has cooled to below the glass transition temperature. Curve No. 2 is calculated for the case in which the film is stripped at the point when a 0.0045 inch layer has formed at a temperature below the glass transition temperature. Both curves are for a polyethylene terephthalate film cast at a temperature of 285° C. and having a glass transition temperature of 75° C.

Figure 2:
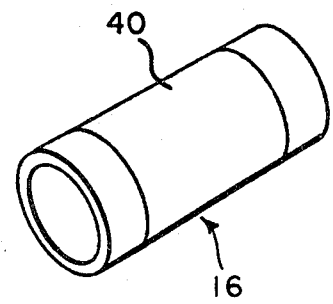
FIG. 2 shows the casting wheel prior to the application of heat stresses.
Figure 3:
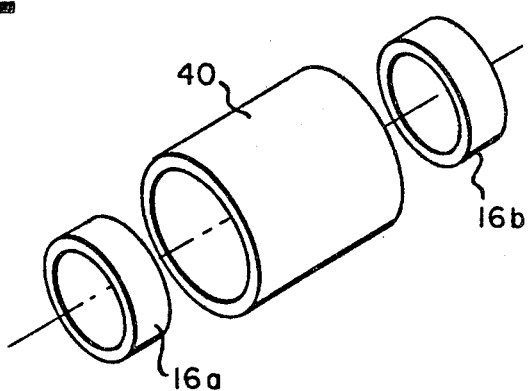
FIGS. 3, 4 and 5 illustrate the casting wheel deformation due to the combined effects of casting a hot polymer web on a portion of the surface area of the internally cooled hollow casting wheel.
Figure 4:
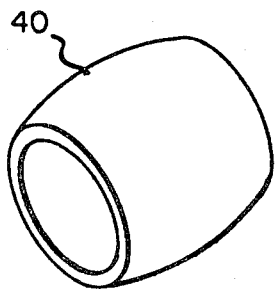

It is obvious from the above that thinner shell casting wheels greatly increase the rate at which a given casting wheel may operate. However, as already mentioned before, the casting wheel is subjected to a variety of thermal stresses. This is depicted in FIGS. 2-5. FIG. 2 illustrates a cylindrical casting wheel 16 upon which is to be cast a molten polymer web which does not cover the full length of the wheel, but only an annular band 40. In the situation depicted in FIG. 3 (immediately following casting) the end portions 16a, 16b, shown as severed from the wheel are still cold and want to retain their original size, but the hot annular band 40 has expanded to a larger diameter. As heat diffuses radially through the shell to the coolant it causes annular band portion 40 to assure a barrel shape (bulge), depicted in FIG. 4. This results because the inside wall of a shell is cooler than the outside and expands to a lesser degree. This, combined with the distortion illustrated in FIG. 3, produces the deformation illustrated (greatly exaggerated) in FIG. 5. Of course, such distortions would interfere with maintaining a uniform casting nip between the extruder and the casting surface, which is necessary in order to produce a uniform thickness web. Conventional casting wheels have therefore been massive in order to provide the structural integrity necessary.

Figure 5:
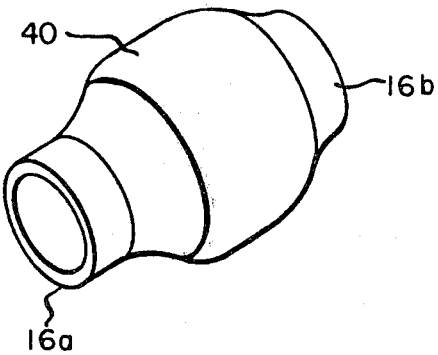

The deformation shown in FIG. 5 will be acceptable if (a) it does not exceed the elastic limits of the materials of construction of the casting wheel, (b) the deformation is predictably repeatable, and (c) does not exceed an amount such that the transverse non-uniformity of the cast film sheet thickness cannot be compensated for by down stream process corrections, such as compensating heating profile during stretching.

If permanent deformation of the casting surface results, because of the thermal stresses illustrated in FIGS. 2-5, the wheel will no longer expand into a repeatably predictable shape, but instead the distortions will be accentuated and product uniformity will suffer. As long as the deformation remains below the elastic limit of the materials of construction, the wheel will return to its original shape at the cessation of operations. This makes it possible to accurately predict the shape of the wheel as distorted under thermal stress and to compensate for it through changes in the design of the extruder lips or the subsequent web treatment following the quenching process or both. Thus, it is important that the deformation be predictable, repeatable, and not excessive. The casting wheels of the past have therefore been massive or have included complicated internal supporting structures to provide the structural integrity necessary.

As pointed out earlier, it has now been surprisingly found that making the casting wheel with a thinner shell does not result in greater deformation, such as illustrated in FIGS. 2-5, but instead the degree of deformation and the thermal stresses appear to actually lessen as the shell thickness is reduced. The radial (elastic) thermal deformation range across that part of the wheel's transverse width over which polymer is cast is given approximately by this equation:

$$Y = D^{0.85} \times (0.0134 \times Z - 3.228 \times 10^{-5} \times Z^2 + 3.28 \times 10^{-8} \times Z^3) \text{ inches}/1000,$$

wherein
D = wheel diameter in feet, and
Z = R S/W wherein
R = polymer feed rate at heat transfer limit of wheel in lbs/hour.
S = wheel shell thickness in inches, and
W = cast film width in inches For a casting wheel having W = 60 inches, D = 5 ft, R = 200 lbs/hour/inch of width, Y is 0.007 inches for a shell thickness of 1.3 inches and 0.005 inches when the shell thickness is reduced to 0.7 inches. Of course, the reduction in shell thickness should not exceed typical safety limits such as established by the ASME pressure vessel design code.

An important criterion in selecting the minimum shell thickness is local transient deformation, such as would occur if, for instance, some impurity or debris were present in the cast polymer, or a minor temperature fluctuation created a small amount of higher viscosity polymer melt. As such harder material is extruded it presses onto the shell surface at the extrusion point with more pressure than normal and locally depresses the shell at that point to a greater degree than it normally would. Hence, the shell thickness must be selected so that it will resist local mechanical stress without permanently deforming. This establishes a lower limit on the wheel shell, specified by the equation $S_{min} = 4.7 \times (D^{\frac{1}{2}})(E^{-\frac{1}{4}})$ where D = wheel diameter in feet, E = modulus of elasticity for the wheel shell in psi and $S_{min}$ is the shell thickness in inches. This formula allows a 50 lb. radial force to be applied locally over a 2 inch diameter circle on the shell without permanently deforming it.

On the other hand, unless the casting wheel shell is reduced to at least a thickness such that heat transfer through the metal is not a limiting factor, the resulting change in the effective heat transfer coefficient will not be significant. This upper limit on the wheel shell thickness may be defined in terms of the wheel diameter D as $$S_{max} = 0.1875 D \text{ for } D \leq 5 \text{ feet}$$

where $S_{max}$ is the maximum shell thickness in inches, contemplated under this invention and $$S_{max} = 0.9375 \text{ for } D > 5 \text{ feet}.$$

Figure 7:
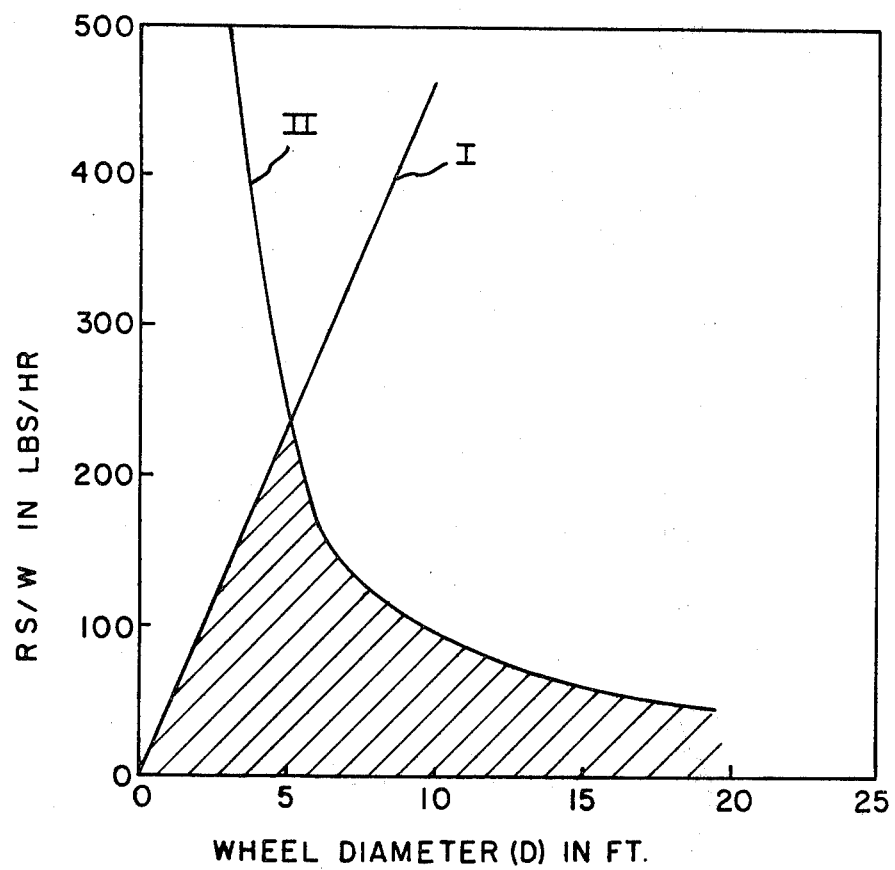
FIG. 7 is a graphic representation of casting rate as a function of casting wheel diameter.

The upper limit for wheels having D > 5 feet is selected such that the transverse thermal deformation across the area where the film is actually formed by the wheel in cooperation with the extruder lip is maintained to less than 0.007 inches. The upper limit for wheels with diameters under or equal to 5 feet is dictated by heat transfer considerations. The effect of the two criteria is shown in the two graphs in FIG. 7. FIG. 7 illustrates the polymer feed rate (R) in lbs/hrs at the heat transfer limit, multiplied by S, i.e., the ratio of the wheel shell thickness (S) in inches, to the cast film width (W), also in inches, plotted as a function of the wheel diameter (D) in feet. The heat transfer limit is shown by curve I while the curve II represents a radial thermal deformation range Y=0.007 inches. The shaded area represents the various possible design and operating conditions for attaining high casting rates with acceptable deformation limits.

It is evident from FIG. 7 that for wheel diameters under 5 feet for cast films having a thickness of 0.090 inches the heat transfer capacity of the wheel defines the operating limits. As the wheel diameter is increased above 5 feet the radial thermal deformation Y defines the operating limit.

In a specific embodiment employing a polyester film, molten polyethylene terephthalate was extruded onto a conventional 5-foot diameter casting wheel having a shell thickness of 1.3 inches. The molten polymer had an "as cast" thickness of 0.090 inches at a temperature of 285° C., and was cooled to a wheel side surface temperature of less than 75° C. at the output of the casting wheel. When the shell thickness of the casting wheel is reduced from 1.3 inches to a thickness of 0.7 inches the wheel adequately satisfies the several criteria disclosed above, providing a three-fold safety margin. At the same time, as shown in FIG. 6, when a 0.0045 inch skin is allowed to form on the casting surface prior to stripping, the rate of production increases by almost two-fold.

While the invention has been described in connection with the casting of a polyester film, it should be understood that the invention is not limited to this but is also applicable to the casting of analogous thermoplastic film-forming polymers such as polycarbonates and polyolefins.

I claim:

1. In a method of forming a polymeric film by casting a molten web of a thermoplastic film-forming polymer on the surface of a rotating casting wheel, cooling the under surface of the molten web on the casting surface to a temperature and depth sufficient to permit stripping it from said casting surface, and subsequently stripping the web from the casting surface; the improvement wherein the production capacity is increased by reducing the shell thickness of the casting wheel to a thickness in inches of less than 0.1875 times the casting wheel diameter in feet but no greater than 0.9375 inches and not less than $4.7 \times D^{0.5} \times E^{-0.25}$ where D is the wheel diameter in feet, and E = the modulus of elasticity of the wheel shell in psi.

2. The process of claim 1 wherein in the first cooling step the undersurface of the molten web is cooled to a temperature below the glass transition temperature of the polymer to a depth not exceeding 25% of the polymer web thickness as cast.

3. The process of claim 1 wherein the polymer is polyethylene terephthalate and the molten web is cast at a temperature of at least 265° C.

4. The process of claim 1 wherein the outer surface of the molten web is cooled and hardened on the casting surface by contact with a gaseous or liquid coolant.

5. The process of claim 1 wherein the casting wheel has a shell thickness of 0.7 inches and a diameter of 5 feet.

6. A film casting wheel for use in forming a self-supporting film of thermoplastic polymer for cooling to its setting point and comprising: a closed hollow body member having a tubular portion forming a shell of heat conductive material, the external surface of which constitutes the casting surface onto which a stream of molten thermoplastic polymer is to be deposited and having end walls of heat conductive material closing the ends of said tubular portion and directly connected thereto so as to be in heat conductive relation therewith; means for supporting said body member for rotation about the axis of said tubular portion; and means for filling said hollow body member with a cooling liquid and for circulating said cooling liquid into and out of said body member while it is rotating to control the temperature of said casting surface; characterized in that said casting wheel has a shell thickness in inches of less than 0.1875 times the wheel diameter "D" measured in feet, but no greater than 0.9375 inches and no less than $4.7D^{0.5} \times E^{-0.25}$ where E is the modulus of elasticity of the wheel shell in psi.

* * * * *